United States Patent
Yoo et al.

(10) Patent No.: US 9,134,733 B2
(45) Date of Patent: *Sep. 15, 2015

(54) ROBOT CLEANER, DOCKING STATION, ROBOT CLEANER SYSTEM INCLUDING ROBOT CLEANER AND DOCKING STATION, AND METHOD OF CONTROLLING ROBOT CLEANER

(75) Inventors: Kyung Hwan Yoo, Incheon-si (KR); Jae Man Joo, Suwon-si (KR); Dong Won Kim, Hwaseong-si (KR); Jun Hwa Lee, Suwon-si (KR); Jun Pyo Hong, Suwon-si (KR); Woo Ram Chung, Seoul (KR); Jae Young Jung, Suwon-si (KR); Hwi Chan Jang, Suwon-si (KR); Jang Youn Ko, Gwangsan-gu (KR); Jeong Gon Song, Gwangju (KR); Sam Jong Jeung, Gwangju (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/067,528

(22) Filed: Jun. 7, 2011

(65) Prior Publication Data

US 2011/0236026 A1   Sep. 29, 2011

Related U.S. Application Data

(63) Continuation of application No. 12/801,575, filed on Jun. 15, 2010, now Pat. No. 8,224,487.

(60) Provisional application No. 61/213,569, filed on Jun. 19, 2009.

(30) Foreign Application Priority Data

Aug. 18, 2009  (KR) .................. 10-2009-0075963
Mar. 4, 2010   (KR) .................. 10-2010-0019376

(51) Int. Cl.
*G05B 15/00*   (2006.01)
*G05B 19/00*   (2006.01)
*G05D 1/02*    (2006.01)

(52) U.S. Cl.
CPC ............ *G05D 1/0225* (2013.01); *G05D 1/0234* (2013.01); *G05D 1/0276* (2013.01); *A47L 2201/00* (2013.01); *A47L 2201/022* (2013.01)

(58) Field of Classification Search
CPC .................... G05D 2201/0203; G05D 1/0242; G05D 1/0225
USPC .......... 700/247–249, 255, 258–259; 382/153; 332/109, 112, 115, 149; 375/238, 239, 375/300, 353; 329/312, 313; 370/212, 213
See application file for complete search history.

(56) References Cited

U.S. PATENT DOCUMENTS 2,472,535 A   6/1949  Jones
2,632,159 A   3/1953  Cunningham
(Continued)

FOREIGN PATENT DOCUMENTS

KR   10-2006-0037008    5/2006
KR   10-0820585         4/2008

OTHER PUBLICATIONS

European Search Report for corresponding European Patent Application No. 11151825.4 dated Mar. 15, 2011, 9 pgs (in English).
(Continued)

*Primary Examiner* — Khoi Tran
*Assistant Examiner* — Harry Oh
(74) *Attorney, Agent, or Firm* — Staas & Halsey LLP

(57) ABSTRACT

A robot cleaner system is described including a docking station to form a docking area within a predetermined angle range of a front side thereof, to form docking guide areas which do not overlap each other on the left and right sides of the docking area, and to transmit a docking guide signal such that the docking guide areas are distinguished as a first docking guide area and a second docking guide area according to an arrival distance of the docking guide signal. The robot cleaner system also includes a robot cleaner to move to the docking area along a boundary between the first docking guide area and the second docking guide area when the docking guide signal is sensed and to move along the docking area so as to perform docking when reaching the docking area.

27 Claims, 17 Drawing Sheets

(56) References Cited

U.S. PATENT DOCUMENTS

| | | | |
|---|---|---|---|
| 2,736,021 A | | 2/1956 | Sunstein |
| 3,396,392 A | * | 8/1968 | Fishbein et al. ............. 342/132 |
| 4,112,421 A | * | 9/1978 | Freeny, Jr. .................... 342/457 |
| 4,217,588 A | | 8/1980 | Freeny |
| 4,816,834 A | | 3/1989 | Bjorke |
| 5,682,313 A | * | 10/1997 | Edlund et al. ................. 342/127 |
| 6,278,917 B1 | * | 8/2001 | Bauer et al. ...................... 701/23 |
| 6,532,404 B2 | * | 3/2003 | Colens .......................... 700/262 |
| 6,734,952 B2 | | 5/2004 | Benz |
| 7,133,746 B2 | * | 11/2006 | Abramson et al. ............ 700/259 |
| 7,315,275 B2 | * | 1/2008 | Stephens ...................... 342/146 |
| 7,477,182 B2 | | 1/2009 | Ikeda |
| 2005/0010330 A1 | | 1/2005 | Abramson et al. |
| 2006/0087273 A1 | | 4/2006 | Ko et al. |
| 2007/0096675 A1 | | 5/2007 | Kim et al. |
| 2007/0213083 A1 | | 9/2007 | Shaanan |
| 2007/0233319 A1 | * | 10/2007 | Im et al. ........................ 700/245 |
| 2007/0244610 A1 | | 10/2007 | Ozick et al. |
| 2007/0267998 A1 | * | 11/2007 | Cohen et al. .................. 320/109 |
| 2008/0058987 A1 | | 3/2008 | Ozick et al. |
| 2008/0065266 A1 | * | 3/2008 | Kim .............................. 700/245 |
| 2008/0091304 A1 | | 4/2008 | Ozick et al. |
| 2008/0174268 A1 | | 7/2008 | Koo et al. |
| 2010/0214082 A1 | | 8/2010 | Covaro et al. |

OTHER PUBLICATIONS

European Search Report for European Patent Application No. 10165910.0 dated Jan. 27, 2011, 9 pgs (in English).

U.S. Appl. No. 12/801,575, filed Jun. 15, 2010, Kyung Hwan Yoo et al., Samsung Electronic Co., Ltd.

U.S. Notice of Allowance mailed Mar. 8, 2012 in related U.S. Appl. No. 12/801,575.

U.S. Office Action mailed Mar. 23, 2012 in related U.S. Appl. No. 13/067,532.

Office Action dated Sep. 15, 2011 for related U.S. Appl. No. 13/067,532.

Office Action dated Sep. 15, 2011 for related U.S. Appl. No. 12/801,575.

U.S. Appl. No. 13/067,532, filed Jun. 7, 2011, Kyung-Hwan Yoo, Samsung Electronic Co., Ltd.

U.S. Office Action mailed Oct. 17, 2012 in related U.S. Appl. No. 13/067,532.

European Search Report issued Nov. 11, 2013 in corresponding European Application No. 13179632.8.

European Search Report issued Nov. 11, 2013 in corresponding European Application No. 13179633.6.

U.S. Final Office Action mailed Aug. 14, 2013 in related U.S. Appl. No. 13/067,532.

Chinese Office Action issued Dec. 9, 2013 in corresponding Chinese Patent Application 201010208702.0.

U.S. Office Action mailed May 6, 2014 in related U.S. Appl. No. 13/067,532.

U.S. Final Office Action issued Oct. 31, 2014 in related U.S. Appl. No. 13/067,532.

U.S. Advisory Action mailed Jan. 26, 2015 in related U.S. Appl. No. 13/067,532.

U.S. Notice of Allowance mailed May 4, 2015 in related U.S. Appl. No. 13/067,532.

* cited by examiner

ROBOT CLEANER, DOCKING STATION, ROBOT CLEANER SYSTEM INCLUDING ROBOT CLEANER AND DOCKING STATION, AND METHOD OF CONTROLLING ROBOT CLEANER

CROSS-REFERENCE TO RELATED APPLICATIONS

This application is a continuation application filed under 35 USC 1.53(b) claiming priority benefit of U.S. Ser. No. 12/801,575 filed in the United States on Jun. 15, 2010 now U.S. Pat. No. 8,224,487, which claims the benefit of U.S. Patent Application No. 61/213,569, filed on Jun. 19, 2009 and Korean Patent Application Nos. 2009-0075963, filed on Aug. 18, 2009 and 2010-0019376, filed on Mar. 4, 2010, in the Korean Intellectual Property Office, the disclosure of which are incorporated herein by reference.

BACKGROUND

1. Field

One or more embodiments of the present disclosure relate to a robot cleaner system including a robot cleaner and a docking station.

2. Description of the Related Art

The term "robot cleaner" refers to a device to perform a cleaning operation such as to suck dust, foreign matter or the like from a floor while traveling in a working area having a predetermined range without user manipulation. The robot cleaner measures distances to obstacles such as furniture, office supplies or walls located within the working area using a sensor or a camera, and performs a predetermined operation using the measured information while traveling without collision with the obstacles.

The robot cleaner automatically cleans while autonomously moving in an area to be cleaned and then moves to a docking station in order to charge a battery of the robot cleaner or to allow for disposal of dust contained in the robot cleaner.

SUMMARY

Therefore, it is an aspect of the present disclosure to provide a robot cleaner guided to a docking position to be docked without an overlapping area where a plurality of docking signals overlap, a docking station, a robot cleaner system including the robot cleaner and the docking station, and a method of controlling the robot cleaner.

It is another aspect of the present disclosure to provide a robot cleaner to measure the period of a docking signal so as to detect a reflected wave, a docking station, a robot cleaner system including the robot cleaner and the docking station, and a method of controlling the robot cleaner.

It is another aspect of the present disclosure to provide a robot cleaner configured to match a plurality of docking signals to the same data codes so as to indicate plural pieces of area information, a docking station, a robot cleaner system including the robot cleaner and the docking station, and a method of controlling the robot cleaner.

Additional aspects of the disclosure will be set forth in part in the description which follows and, in part, will be obvious from the description, or may be learned by practice of the disclosure.

In accordance with one aspect of the present disclosure, there is provided a robot cleaner system including: a docking station to form a docking area within a predetermined angle range of a front side thereof, to form docking guide areas which do not overlap each other on the left and right sides of the docking area, and to transmit a docking guide signal such that the docking guide areas are distinguished as a first docking guide area and a second docking guide area according to an arrival distance of the docking guide signal; and a robot cleaner to move to the docking area along a boundary between the first docking guide area and the second docking guide area when the docking guide signal is sensed and to move along the docking area so as to perform docking upon reaching the docking area.

The docking station may transmit a docking signal to a central portion of a front side of a main body thereof within the predetermined angle range so as to form the docking area.

The docking station may include first and second transmission units to transmit docking guide signals to both sides of a front portion of a main body thereof and a third transmission unit to transmit the docking signal to a central portion of the front side of the main body thereof within the predetermined angle range.

The first and second transmission units may include first and second light emitting units to generate docking guide signals and first and second shading plates to block some of the docking guide signals passing through a first lens unit or a second lens unit so as to reduce spreading angles of the docking guide signals, respectively.

The robot cleaner system may further include first and second lens units provided outside the first and second light emitting units so as to spread the docking guide signals.

The third transmission unit may include a third light emitting unit to generate the docking signal and a guide portion to guide a traveling direction of the docking signal such that the docking signal is formed within the predetermined angle range.

In accordance with another aspect of the present disclosure, there is provided a docking station including: at least one transmission unit to form a docking area within a predetermined angle range of a front side thereof, to form docking guide areas which do not overlap each other on the left and right sides of the docking area, and to transmit a docking guide signal such that the docking guide areas are distinguished as a first docking guide area and a second docking guide area according to an arrival distance of the docking guide signal, wherein the transmission unit forms signals directed to the first docking guide area and the second docking guide area in the form of one signal and transmits the signal.

The forming of the signals directed to the first docking guide area and the second docking guide area in the form of one signal may include forming a signal having a large amplitude, which reaches both the first docking guide area and the second docking guide area, and a signal having a small amplitude, which reaches only the second docking guide area, in the form of one signal.

The forming of the signals directed to the first docking guide area and the second docking guide area in the form of one signal may include forming signals having different amplitudes in the form of one signal, such that only a signal having a large amplitude is analyzed as a data bit in the first docking guide area and both the signal having the large amplitude and a signal having a small amplitude are analyzed as the data bit in the second docking guide area.

The transmission unit to transmit the docking guide signal may include a light emitting unit to generate the docking guide signal and a shading plate to block some of the docking guide signal so as to reduce a spreading angle of the docking guide signal.

The docking station may further include a lens unit provided outside the light emitting unit so as to spread the docking guide signal.

The docking station may further include a transmission unit to transmit a docking signal to a central portion of a front side of a main body thereof within a predetermined angle range such that a docking area which does not overlap the first docking guide area or the second docking guide area is formed.

The transmission unit to transmit the docking signal may include a light emitting unit to generate the docking signal and a guide portion to guide a traveling direction of the docking signal such that the docking signal is formed at the central portion of the front side of the main body within the predetermined angle range.

In accordance with another aspect of the present disclosure, there is provided a docking station including: at least one transmission unit to form a docking area within a predetermined angle range of a front side thereof, to form docking guide areas which do not overlap each other on the left and right sides of the docking area, and to transmit a docking guide signal such that the docking guide areas are distinguished as a first docking guide area and a second docking guide area according to an arrival distance of the docking guide signal, wherein delay times of a plurality of high periods included in the docking guide signal are adjusted to different lengths.

The adjusting of the delay times of the plurality of high periods to the different lengths may include adjusting delay times of consecutive high periods of the plurality of high periods to different lengths.

The docking station may further include a transmission unit to transmit a docking signal to a central portion of a front side of a main body thereof within a predetermined angle range such that a docking area which does not overlap the first docking guide area or the second docking guide area is formed, delay times of a plurality of high periods included in the docking signal may be adjusted to different lengths.

The adjusting of the delay times of the plurality of high periods to the different lengths may include adjusting delay times of consecutive high periods of the plurality of high periods to different lengths.

The transmission unit to transmit the docking signal may include a light emitting unit to generate the docking signal and a guide portion to guide a traveling direction of the docking signal such that the docking signal is formed at the central portion of the front side of the main body within the predetermined angle range.

The transmission unit to transmit the docking guide signal may include a light emitting unit to generate the docking guide signal and a shading plate to block some of the docking guide signal so as to reduce a spreading angle of the docking guide signal.

The docking station may further include a lens unit provided outside the light emitting unit so as to spread the docking guide signal.

In accordance with a further aspect of the present disclosure, there is provided a method of controlling a robot cleaner, the method including: checking whether the robot cleaner needs to be docked at a docking station; moving the robot cleaner toward a boundary between a first docking guide area formed a predetermined distance or more from the docking station and a second docking guide area formed within the predetermined distance from the docking station, if the robot cleaner needs to be docked; moving the robot cleaner along the boundary to reach a docking area formed at a central portion of a front side of the docking station within a predetermined angle range, if the boundary is sensed; and moving the robot cleaner along the docking area so as to dock the robot cleaner at the docking station, if the robot cleaner reaches the docking area.

The sensing of the boundary may include moving the robot cleaner in a direction of the docking station if the robot cleaner is first located in the first docking guide area and determining that the robot cleaner is located at the boundary when the robot cleaner reaches the second docking guide area while moving in the direction of the docking station.

The sensing of the boundary may include moving the robot cleaner in a direction different from a direction of the docking station if the robot cleaner is first located in the second docking guide area and determining that the robot cleaner is located at the boundary when the robot cleaner reaches the first docking guide area while moving.

According to the embodiments of the present disclosure, since a docking area is formed by mounting a simple component in a docking station, manufacturing costs associated with components are reduced.

According to the embodiments of the present disclosure, since the period of the docking signal is measured so as to distinguish the docking signal from a reflected wave, the robot cleaner is prevented from moving in an undesired direction. At this time, the docking signal is easily distinguished from the reflected wave by changing the length of the docking signal.

According to the embodiments of the present disclosure, the robot cleaner quickly checks area information of a docking guide signal by containing plural pieces of area information in one docking guide signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings.

Figure 1:
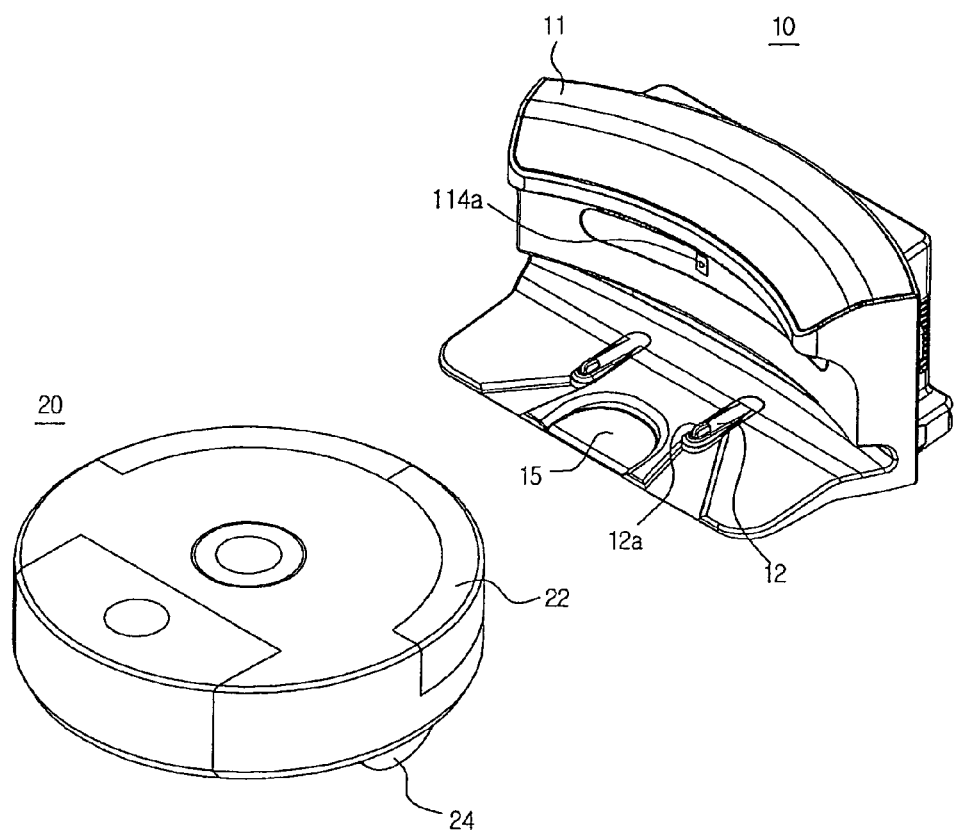
FIG. 1 is an appearance perspective view of a robot cleaner system according to an embodiment of the present disclosure.
Figure 2:
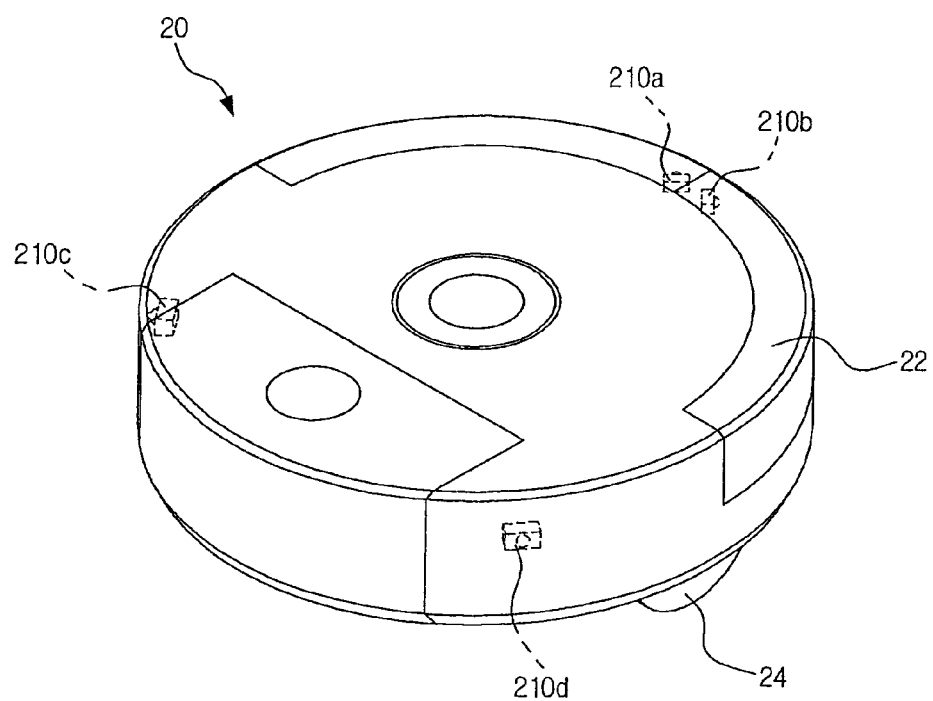
FIG. 2 is a perspective view of a robot cleaner according to an embodiment of the present disclosure.

FIG. 1 is an appearance perspective view of a robot cleaner system according to an embodiment of the present disclosure, and FIG. 2 is a perspective view of a robot cleaner according to an embodiment of the present disclosure.

Figure 3A:
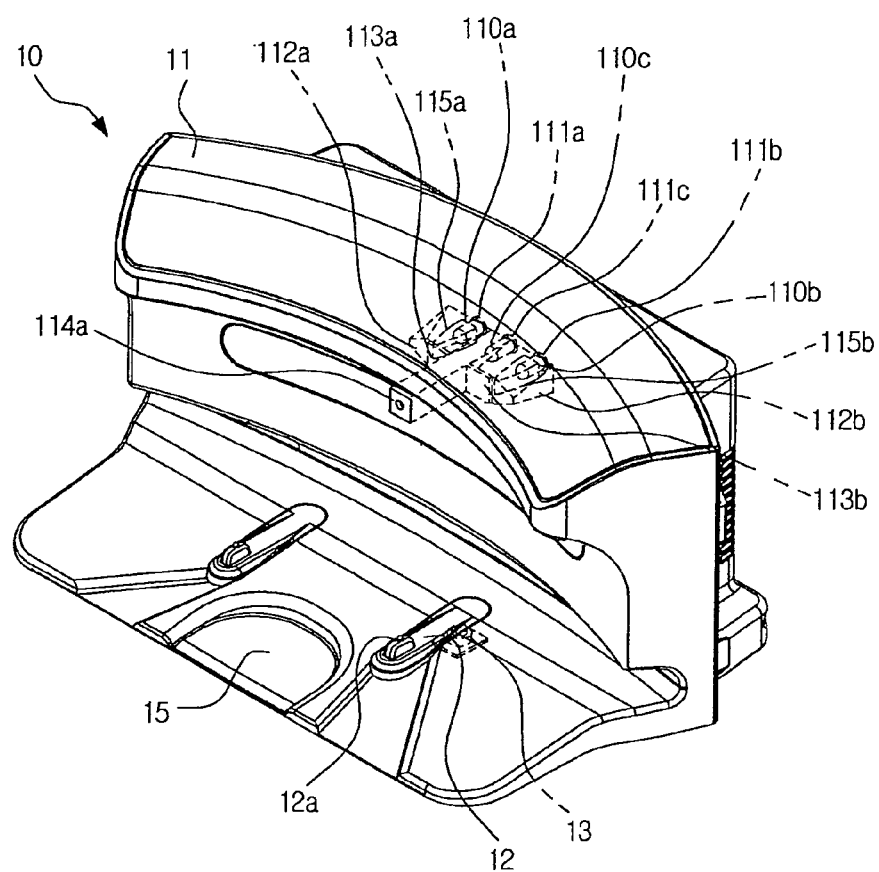
FIG. 3A is a front perspective view of a docking station according to an embodiment of the present disclosure.
Figure 3B:
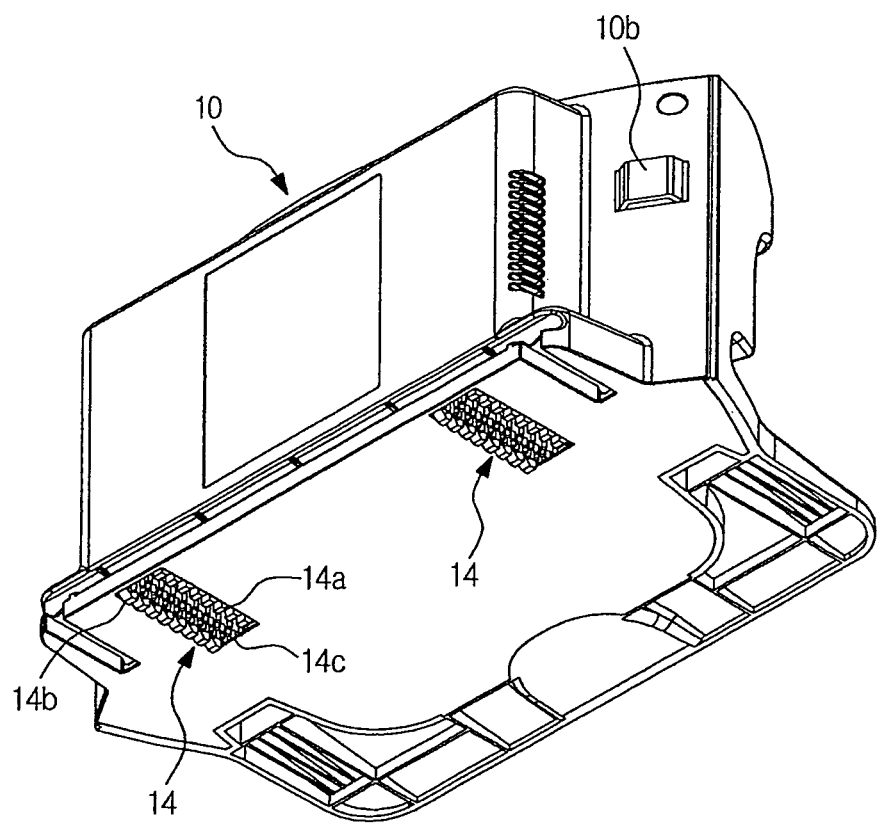
FIG. 3B is a back perspective view of a docking station according to an embodiment of the present disclosure.
Figure 4:
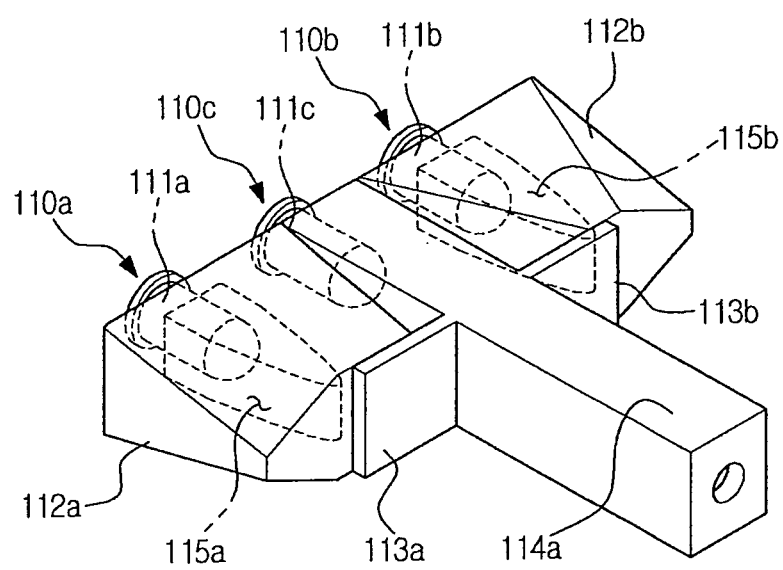
FIG. 4 is an enlarged view of a transmission unit included in a docking station according to an embodiment of the present disclosure.

FIG. 3A is a front perspective view of a docking station according to an embodiment of the present disclosure, FIG. 3B is a back perspective view of a docking station according to an embodiment of the present disclosure, and FIG. 4 is an enlarged view of a transmission unit included in a docking station according to an embodiment of the present disclosure.

As shown in FIGS. 1 and 2, the robot cleaner system includes a robot cleaner 20 and a docking station 10 to charge a battery of the robot cleaner 20.

Referring to FIG. 2, the robot cleaner 20 includes a main body 22 forming an appearance thereof, reception units 210a to 210d mounted on front and back sides of the main body 22 to receive signals transmitted from the docking station 10, and driving wheels 24 mounted on a lower side of the main body 22 to move the robot cleaner 20.

The reception units 210a to 210d of the robot cleaner 20 receive a docking signal or docking guide signals transmitted from the docking station 10. In the reception units 210a to 210d of the robot cleaner 20 according to the embodiment of the present disclosure, two reception units are mounted on a central portion of the front side of the main body 22 and two reception units are mounted on both sides of the back portion of the main body 22, although other positions and quantities may be used.

The driving wheels 24 of the robot cleaner 20 are mounted on the left and right side of the main body 22 and are independently driven by a motor driving unit (not shown) to move the robot cleaner 20 in a desired direction. A plurality of auxiliary wheels (e.g., casters) to support the main body 22 and smoothen traveling of the robot cleaner 20 may be mounted on the front and back sides of the driving wheels 24.

Referring to FIGS. 3A and 3B, the docking station 10 includes a main body 11 forming an appearance thereof and transmission units 110a, 110b and 110c mounted on the main body 11 to transmit the docking signal and the docking guide signals.

The first transmission unit 110a and the second transmission unit 110b, to transmit the docking guide signals, are mounted on both sides of a front portion of an upper end of the docking station 10, and the third transmission unit 110c is mounted on a central portion of the front side of the upper end of the docking station 10 to transmit the docking signal within a predetermined angle range.

A slip prevention pad 14 to prevent movement of the docking station 10 is attached to a lower end of the docking station 10. The slip prevention pad 14 is made of a material (e.g., rubber) having a high coefficient of friction. The slip prevention pad 14 includes a first slip prevention portion 14a obliquely extending in an opposite direction of a docking direction of the robot cleaner 20, a second slip prevention portion 14b obliquely extending in an opposite direction of a separation direction of the robot cleaner 20, and a third slip prevention portion 14c extending downward in a pin shape. In addition, a guide groove 15 is concavely formed in the lower end of the docking station 10 such that a connection terminal 242 (not shown) of the robot cleaner 20 is stably connected to a charging terminal 12 of the docking station 10.

The charging terminal 12 to charge the battery of the robot cleaner 20 is provided on the lower end of the docking station 10. An embossed portion 12a is provided on an upper surface of the charging terminal 12 such that the connection with the connection terminal 242 (not shown) of the robot cleaner 20 becomes stable. A tact switch 13 pressed when the robot cleaner 20 enters the docking station 10 is mounted on the inside of the lower end of the docking station 10. When the tact switch 13 is pressed, power is applied to the charging terminal 12.

Referring to FIG. 4, in the transmission units 110a to 110c included in the docking station 10, the first transmission unit 110a and the second transmission unit 110b are mounted on both sides of the transmission unit 110c to externally transmit the docking guide signals, and the third transmission unit 110c is mounted between the transmission units 110a and 110b to transmit the docking signal within the predetermined angle range.

The first transmission unit 110a and the second transmission unit 110b include a first light emitting unit 111a and a second light emitting unit 111b to generate the docking guide signals, a first lens unit 112a and a second lens unit 112b to spread the docking guide signals generated by the first light emitting unit 111a and the second light emitting unit 111b, and a first shading plate 113a and a second shading plate 113b mounted on the front side of the first lens unit 112a and the second lens unit 112b to block some of the docking guide signals passing through the lens units 112a and 112b so as to adjust spread angles of the signals, respectively.

Each of the first lens unit 112a and the second lens unit 112b includes a 180-degree spread lens to adjust the spread angle of the signal to 180° using a refractive index of the surface thereof. Outer surfaces of the first lens unit 112a and the second lens unit 112b are polyhedral and grooves 115a and 115b having curved surfaces are formed in the inside thereof so as to better spread light.

The third transmission unit 110c includes a third light emitting unit 111c to generate the docking signal, and a guide portion 114a to guide a traveling direction of the docking signal such that the docking signal generated by the third light emitting unit 11c is transmitted within the predetermined angle range. The guide portion 114a is a slit which is made of a material such as metal or a shading plate, through which infrared light may not pass, and thereby functions as an infrared light blocking device.

Meanwhile, the first to third light emitting units 111a to 111c include infrared light emitting elements to generate infrared signals or Light Emitting Diodes (LEDs) to generate light beams.

Figure 5:
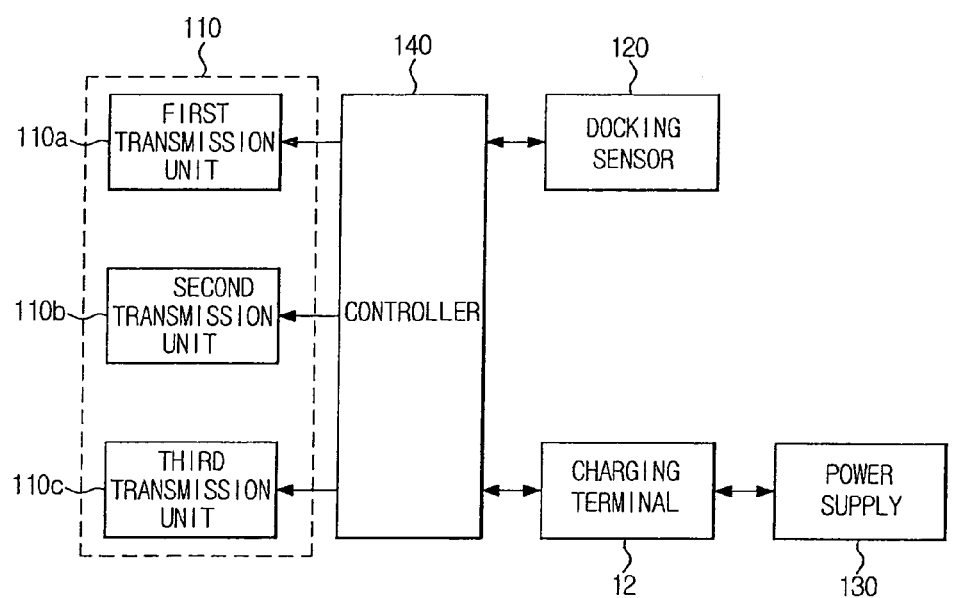
FIG. 5 is a control block diagram of a docking station according to an embodiment of the present disclosure.
Figure 7:
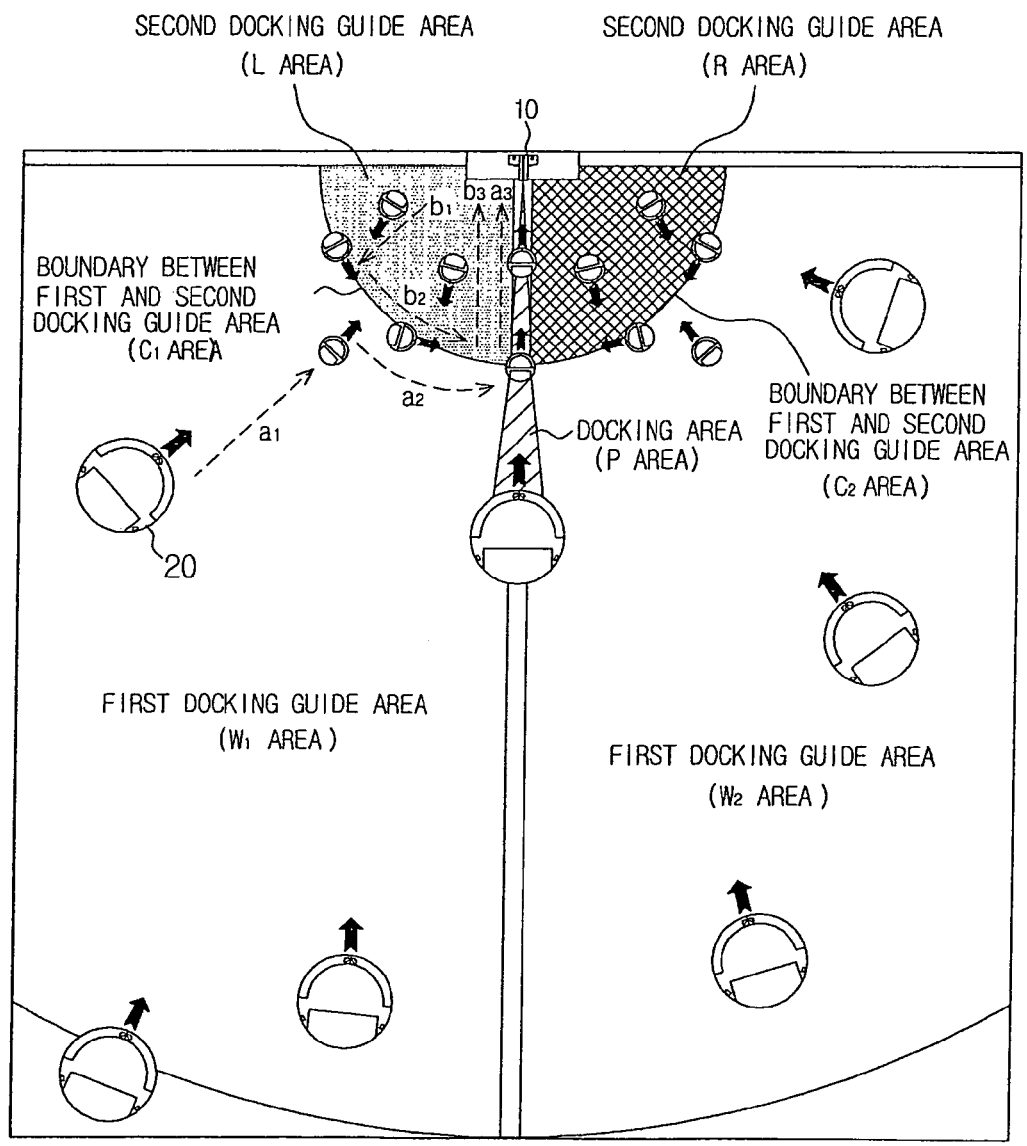
FIG. 7 is a conceptual diagram illustrating an operation principle of a robot cleaner system according to an embodiment of the present disclosure.

FIG. 5 is a control block diagram of a docking station according to an embodiment of the present disclosure, and FIG. 7 is a conceptual diagram illustrating operation principle of a robot cleaner system according to an embodiment of the present disclosure.

As shown in FIG. 5, the docking station 10 includes the first and second transmission units 110a and 110b to transmit the docking guide signals, the third transmission unit 110c to transmit the docking signal, the charging terminal 12 to charge the battery of the robot cleaner 20, a power supply 130 to supply power to the charging terminal 12, a docking sensor 120 to sense docking of the robot cleaner 20, and a controller 140 to control the overall operation of the docking station 10.

Referring to FIG. 7, the first transmission unit 110a and the second transmission unit 110b transmit a left-area signal (L-area and $W_1$-area signal) and a right-area signal (R-area and $W_2$-area signal), both of which are the docking guide signals, to docking guide areas, respectively. The left-area signal and the right-area signal are distinguished from each other by a bit array. For example, the left-area signal may be set to a bit array of "01" and the right-area signal may be set to a bit array of "10". The detailed description of the bit array of each area signal will be given later. Meanwhile, since the signals are transmitted from the first transmission unit 110a and the second transmission unit 110b at the spread angle of about 90 degrees or less by the shading plates 113a and 113b, a docking area (P area) distinguished from the docking guide areas is formed in a central area of a front side of the docking station 10. Meanwhile, the docking area (P area) may be implemented as a non-signal area without a separate signal. That is, the docking of the robot cleaner 20 may be controlled by stopping the operation of the third transmission unit 100c and setting an area, in which a signal is absent within a predetermined angle range of the front side of the docking station 10, as the docking area.

The third transmission unit 110c transmits a central-area signal, which is the docking signal having a narrow transmission angle range, to the docking area. The third transmission unit 110c includes the guide portion 114a to guide the docking signal, and the guide portion 114a guides the traveling direction of the docking signal emitted from the third light emitting unit 111c such that the docking signal is formed in a predetermined area located at a central portion of a front side of the docking station 10.

The charging terminal 12 is connected to the connection terminal 242 (not shown), which is electrically connected to a rechargeable battery (not shown) mounted in the robot cleaner 20. The charging terminal 12 supplies power upon being connected to the connection terminal of the robot cleaner 20.

The power supply 130 supplies power to the charging terminal 12 so as to charge the rechargeable battery of the robot cleaner 20.

The controller 140 is a microprocessor to control the overall operation of the docking station 10 such that power is supplied to the charging terminal 12 through the power supply 130 according to a docking sensing signal transmitted from the docking sensor 120.

Figure 9A:
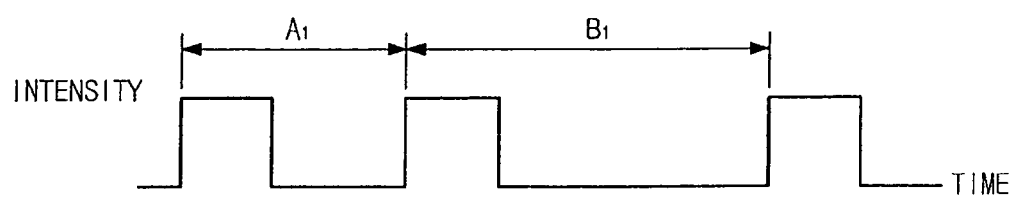
FIGS. 9A, 9B, 9C, and 9D are views illustrating a detection principle of a reflected wave according to an embodiment of the present disclosure.
Figure 9B:
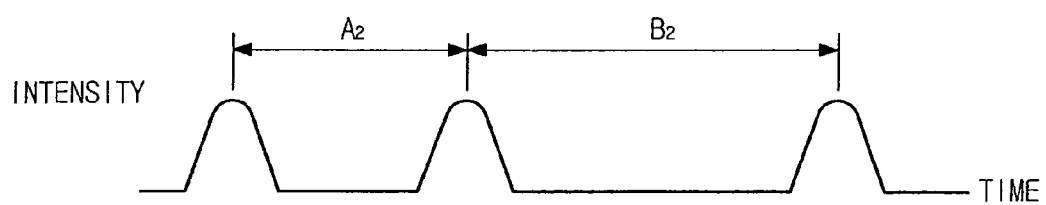
Figure 9C:
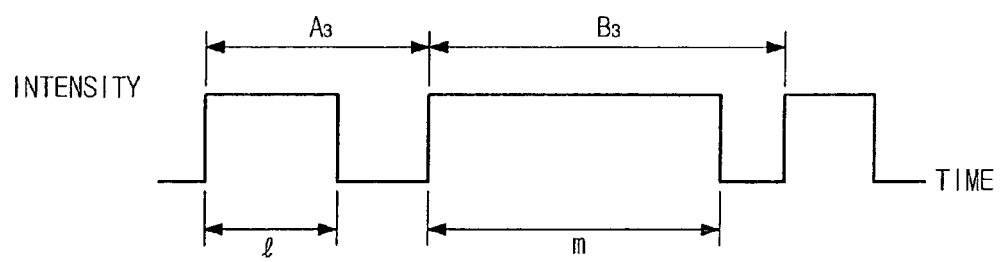
Figure 9D:
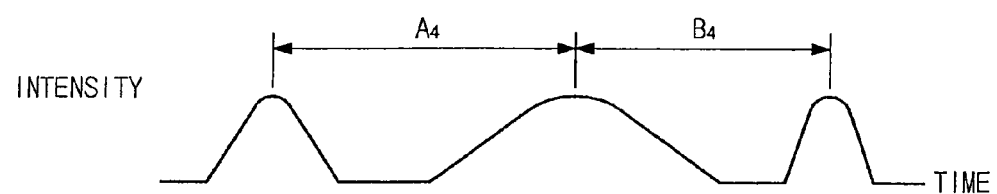

The controller 140 adjusts the time lengths of high periods of data bits of the docking signal transmitted from the first to third transmission units 110a to 110c such that the robot cleaner 20 distinguishes the docking signal from a reflected wave. The robot cleaner 20 measures the time length between a start point of a high period and a start point of a subsequent high period of the docking signal transmitted from the docking station 10 so as to determine the data bits. Referring to FIGS. 9A to 9D, FIG. 9A shows the docking guide signal or the docking signal and FIG. 9B shows the reflected wave produced by reflection of the docking signal or the docking guide signal from an obstacle. When a signal weakens as shown in FIG. 9B, the robot cleaner 20 measures time lengths $A_2$ and $B_2$ between a highest point of a first high period and a highest point of a second high period which is a subsequent high period so as to determine the data bits. At this time, it can be seen that the distances $A_1$ and $B_1$ between the high periods and the distances $A_2$ and $B_2$ between the high periods are equal to each other, respectively ($A_1=A_2$ and $B_1=B_2$). Accordingly, the reflected wave produced by reflection of the docking signal or the docking guide signal from the obstacle may not be recognized by the robot cleaner 20. Therefore, the controller 140 adjusts delay times of the high periods of the data bits of the docking guide signal or the docking signal to be different from each other. Referring to FIGS. 9C and 9D, if the signals in which the lengths of the high periods of the data bits are set to l and m are transmitted, time lengths between a start point of a high period and a start point of a subsequent period shown in FIG. 9C become $A_3$ and $B_3$. At this time, the distances between the high periods of the reflected wave shown in FIG. 9D become $A_4$ and $B_4$. Since the time lengths $A_3$ and $B_3$ and $A_4$ and $B_4$ are respectively different from each other, the robot cleaner 20 may recognize the signal having the time lengths $A_4$ or $B_4$ different from the stored time lengths of the high periods as the reflected wave.

The controller 140 adjusts the data bits of the docking signal transmitted from the third transmission unit 110c or the docking guide signals transmitted from the first transmission unit 110a and the second transmission unit 110b so as to contain different area signals in one signal. For example, the first transmission unit 110a does not separately transmit a docking guide signal directed to the first docking guide area and a docking guide signal directed to the second docking guide area at a time interval. Instead, the first transmission unit 110a forms the signal directed to the first docking guide area and the signal directed to the second docking guide area in the form of one signal and transmits the signal to both the first docking guide area and the second docking guide area, thereby shortening the periods of several area signals to the period of one signal. For example, as shown in Table 1, a left-area bit array is "01", a right-area bit array is "10", and a long-distance area bit array is "11".

TABLE 1

| | Left area (short-distance area) | Right area (short-distance area) | Long-distance area |
|---|---|---|---|
| Data bit | 01 | 10 | 11 |

Figure 10A:
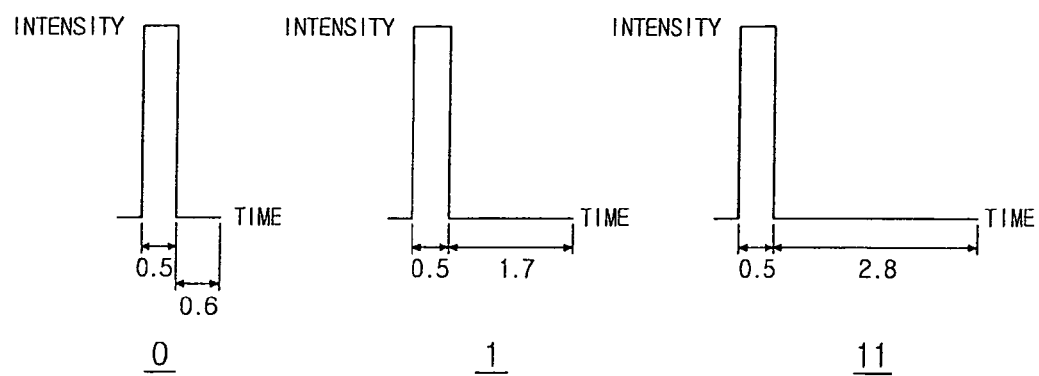
FIGS. 10A, 10B, 10C, and 10D are views illustrating a principle of matching a plurality of docking signals to one data code and forming plural pieces of area information according to an embodiment of the present disclosure.
Figure 10B:
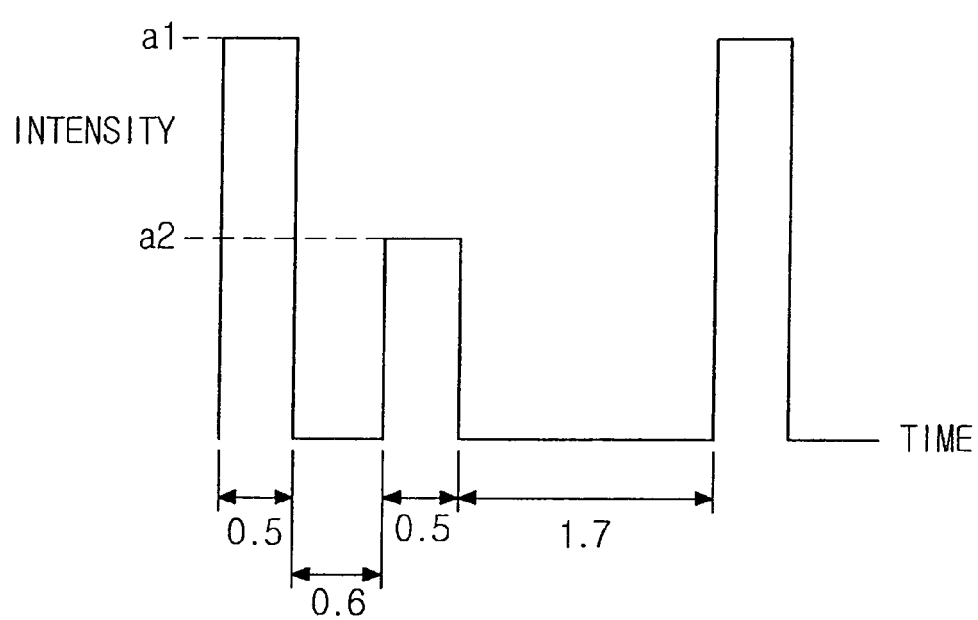
Figure 10C:
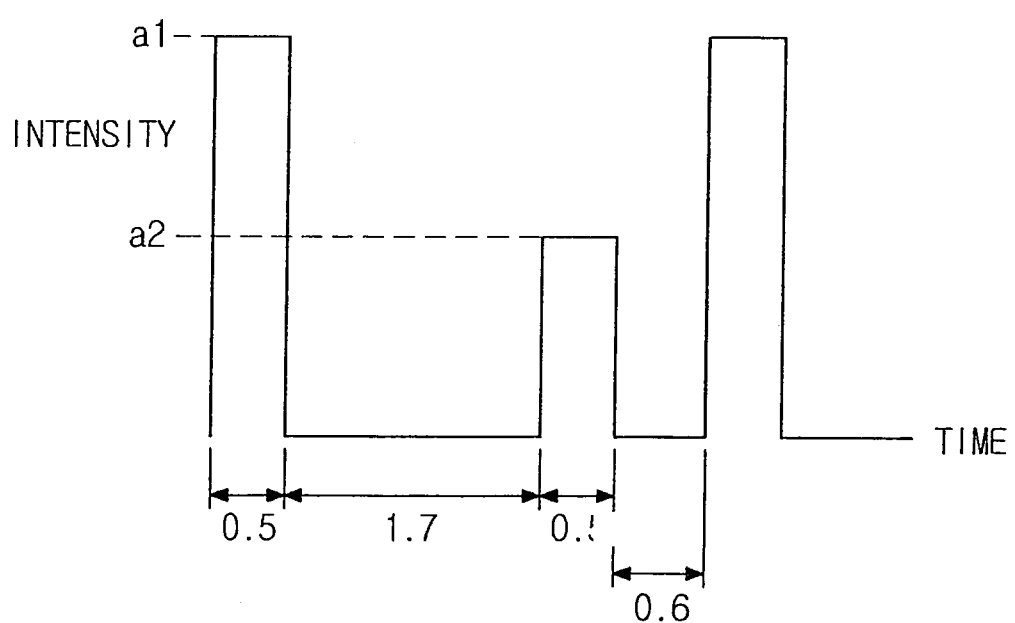

At this time, referring to FIG. 10A, in the time length of the bit, if it is assumed that the time length of the high period of a bit "0" is 0.5, the time length of the low period of the bit "0" is 0.6, the time length of the high period of a bit "1" is 0.5, the time length of the low period of the bit "1" is 1.7, the time length of the high period of a bit "11" is 0.5, and the time length of the low period of the bit "11" is 2.8, the first transmission unit 110a and the second transmission unit 110b transmit one signal, in which the first docking guide signal and the second docking guide signal are included, as a docking guide signal, as shown in FIGS. 10B and 10C. Referring to FIG. 10B, the amplitudes of the high periods are differently set. A signal having an amplitude a1 reaches the first docking guide area which is a long-distance docking guide area and a signal having an amplitude a2 reaches only the second docking guide area which is a short-distance docking guide area.

Figure 10D:
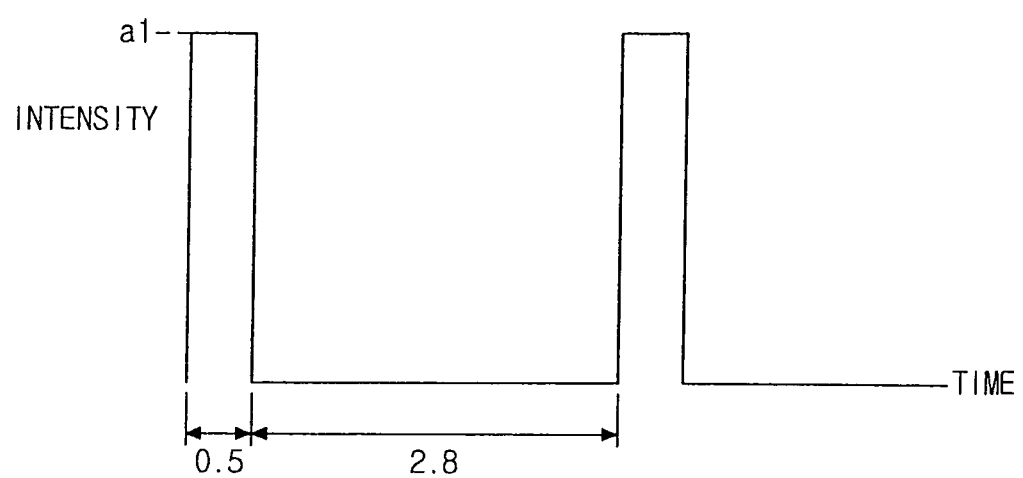

For example, in the docking guide signal shown in FIG. 10B, since both the high signal having the amplitude a1 and the high signal having the amplitude a2 reach the short-distance docking guide area, the high signal having the time length of 0.5 (the high signal having the amplitude a1) and the subsequent low signal having the time length of 0.6 are analyzed as the bit "0" and the subsequent high signal having the time length of 0.5 (the high signal having the amplitude a2) and the subsequent low signal having the time length of 1.7 are analyzed as the bit "1". Therefore, the total bit array is "01" and is analyzed as the left-area short-distance docking guide signal. In addition, since the high signal having the amplitude a1 reaches the long-distance docking guide area but the high signal having the amplitude a2 does not reach the long-distance docking guide area, a signal shown in FIG. 10D reaches the robot cleaner 20. Therefore, the high signal having the time length of 0.5 (the high signal having the amplitude a1) and the subsequent low signal having the time length of 2.8 are input, and information "11" is input and is analyzed as the long-distance docking guide signal.

As another example, in the docking guide signal shown in FIG. 10C, since both the high signal having the amplitude a1 and the high signal having the amplitude a2 reach the short-distance docking guide area, the high signal having the time length of 0.5 (the high signal having the amplitude a1) and the subsequent low signal having the time length of 1.7 are analyzed as the bit "1" and the subsequent high signal having the time length of 0.5 (the high signal having the amplitude a2) and the subsequent low signal having the time length of 0.6 are analyzed as the bit "0". Therefore, the total bit array "10" is analyzed as the right-area short-distance docking guide signal. In addition, since the high signal having the amplitude a1 reaches the long-distance docking guide area but the high signal having the amplitude a2 does not reach the long-distance docking guide area, a signal shown in FIG. 10D reaches the robot cleaner 20. Therefore, the high signal having the time length of 0.5 (the high signal having the amplitude a1) and the subsequent low signal having the time length of 2.8 are input, and information "11" is input and is analyzed as the long-distance docking guide signal.

As described above, if the short-distance docking guide signal and the long-distance docking guide signal are transmitted in the period of one signal, the robot cleaner 20 more quickly distinguishes the area, compared with the related art (a time difference between area signals is reduced).

Figure 6:
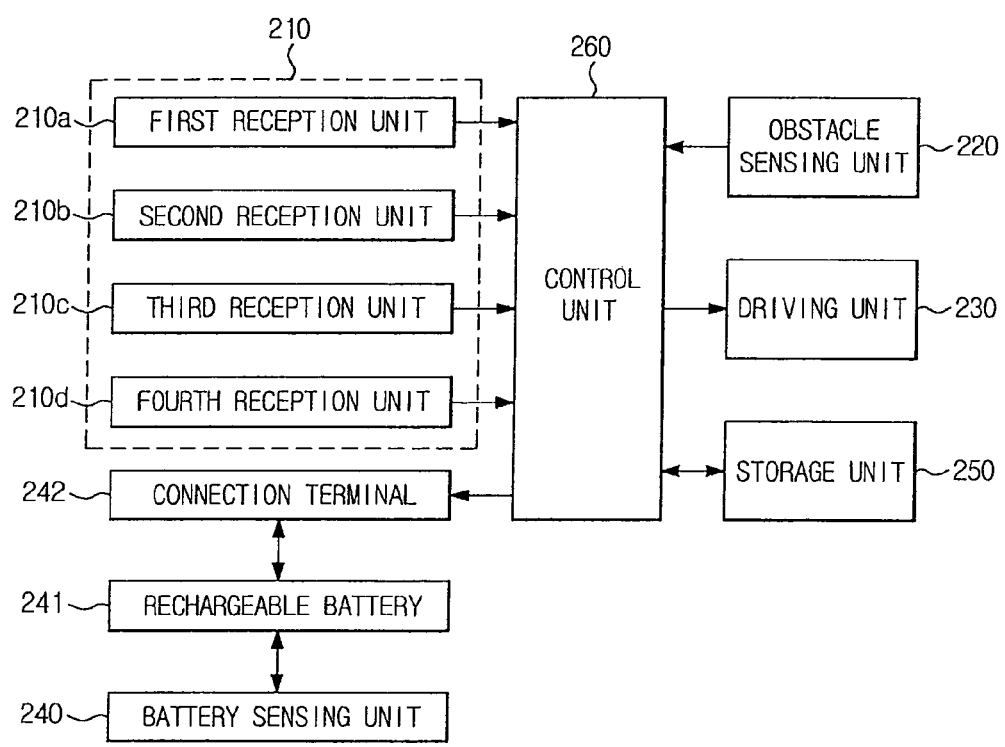
FIG. 6 is a control block diagram of a robot cleaner according to an embodiment of the present disclosure.

FIG. 6 is a control block diagram of a robot cleaner according to an embodiment of the present disclosure.

The robot cleaner 20 includes reception units 210a to 210d to receive docking signals or a remote control signal, an obstacle sensing unit 220 to sense a peripheral obstacle, a driving unit 230 to drive the robot cleaner 20, a battery sensing unit 240 to sense the residue of the battery, a storage unit 250 to store a traveling pattern or the like of the robot cleaner 20, and a control unit 260 to control the robot cleaner 20.

The reception units 210a to 210d receive the docking signals transmitted from the first to third transmission units 110a to 110c of the docking station 10. The reception units 210a to 210d include infrared reception modules to receive the docking signals, and the infrared reception modules include infrared reception elements to receive infrared signals in a specific band.

The obstacle sensing unit 220 senses furniture, office supplies, walls, or other obstacles located within an area in which the robot cleaner 20 travels. The obstacle sensing unit 220 may include all-direction sensors and an analog/digital converter (not shown). The all-direction sensors are provided on all sides of the robot cleaner and include RF sensors to emit RF signals and to detect signals reflected from peripheral obstacles. The obstacle sensing unit 220 receives the signals, converts the analog signals into digital signals through the analog/digital converter, and generates and transmits obstacle sensing signals to the control unit 260.

The driving unit 230 controls the level of power applied to a motor (not shown) connected to the driving wheels 24 according to a control signal output from the control unit 260 so as to drive the robot cleaner 20.

The battery sensing unit 240 senses the charging residue of the rechargeable battery 241 to supply driving power of the robot cleaner 20 and transmits information about the charging residue to the control unit 260.

The storage unit 250 stores an operating system to drive the robot cleaner 20, a traveling pattern, and the like, and stores location information of the robot cleaner 20, obstacle information, and the like. A non-volatile memory such as a flash memory or an Electrically Erasable Programmable Read-Only Memory (EEPROM) may be used as the storage unit. Data stored in the storage unit 250 is controlled by the control unit 260.

The control unit 260 is a microprocessor to control the overall operation of the robot cleaner 20 and determines whether the robot cleaner is docked at the docking station 10 according to a docking request signal transmitted from the battery sensing unit 240. The control unit 260 determines the traveling direction of the robot cleaner 20 according to the docking guide signals or the docking signals received by the reception units 210a to 210d so as to dock the robot cleaner at the docking station 10. The detailed method of docking the robot cleaner 20 at the docking station 10 will be described later.

Figure 8:
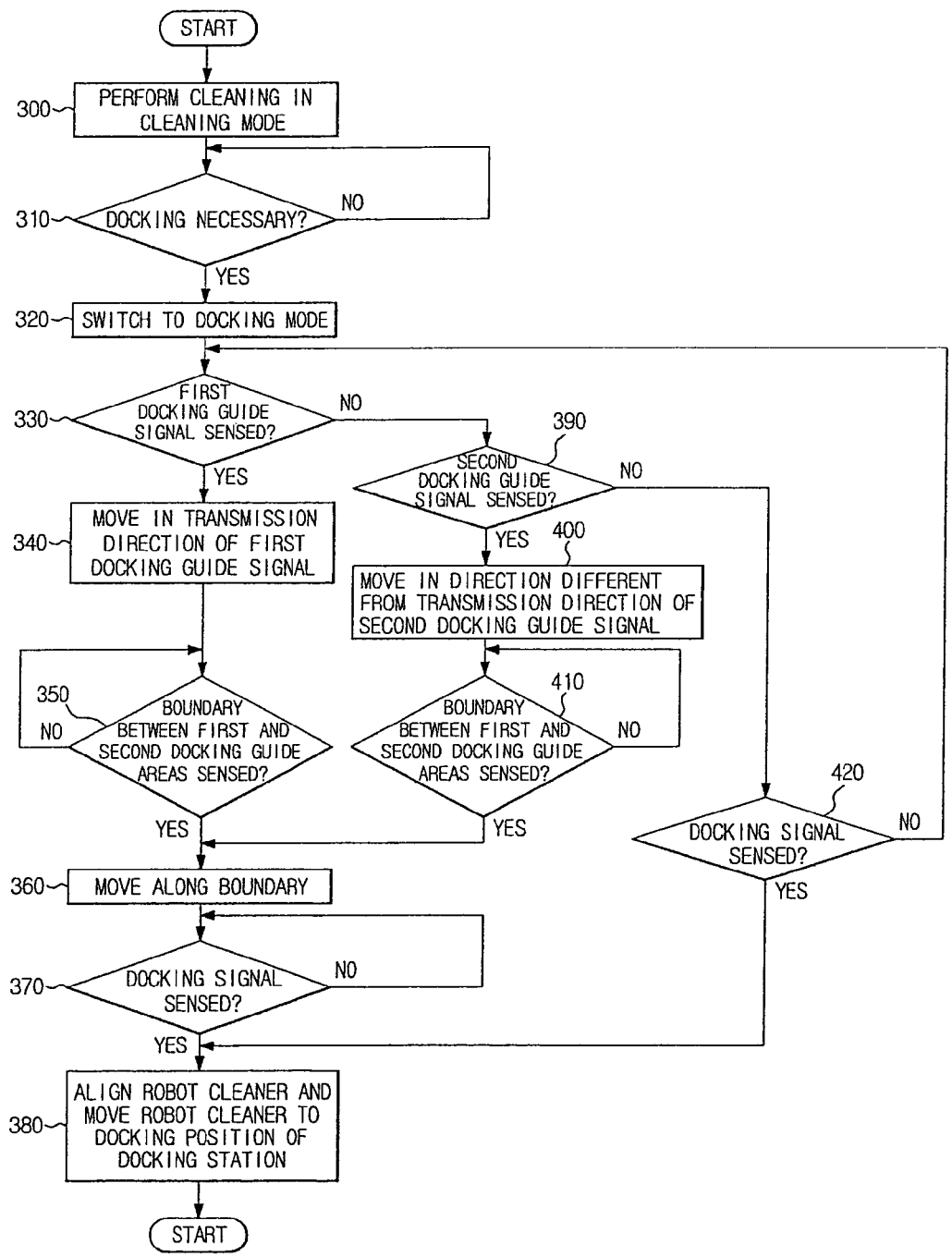
FIG. 8 is a flowchart illustrating a docking process of a robot cleaner according to an embodiment of the present disclosure.

FIG. 8 is a flowchart illustrating a docking process of a robot cleaner according to an embodiment of the present disclosure.

The robot cleaner 20 set in a cleaning mode performs a cleaning operation according to an input cleaning route or a randomly selected cleaning route. The robot cleaner 20 checks whether the residue of the battery is decreased to a predetermined level or less during the cleaning operation or whether the amount of accumulated dust or the like is equal to or greater than a predetermined amount so as to check whether the robot cleaner 20 needs to be docked at the docking station 10 (300 and 310).

Next, if the robot cleaner 20 needs to be docked, the cleaning mode is switched to a docking mode. If the robot cleaner 20 is in the docking mode, the robot cleaner 20 moves along a random route or a set route in order to sense a docking signal or a docking guide signal (320).

Next, the robot cleaner 20 checks whether a first docking guide signal is sensed. The first docking guide signal is transmitted from the first transmission unit 110a or the second transmission unit 110b to a long-distance area. The robot cleaner 20 determines that the robot cleaner is located in the first docking area which is a long-distance area, when the first docking guide signal is sensed (330).

Next, when the first docking guide signal is sensed, the robot cleaner 20 moves toward the docking station 10 to transmit the first docking guide signal. The robot cleaner 20 moves in the transmission direction of the first docking guide signal when the reception units 210a to 210d, mounted on the front side thereof, receive the signal (340).

Next, the robot cleaner 20 checks whether a boundary between the first docking guide area and the second docking guide area is sensed, while moving in the transmission direction of the first docking guide signal. The first docking guide area is a wide long-distance docking guide area and the second docking guide area is a short-distance docking guide area. The robot cleaner 20 continuously senses the docking guide signal even when moving in the transmission direction of the first docking guide signal and determines that the robot cleaner is located at the boundary when the sensed docking guide signal is changed from the first docking guide signal to the second docking guide signal (350).

Next, the robot cleaner 20 moves along the boundary when the boundary between the first docking guide area and the second docking guide area is sensed. The robot cleaner 20 may check whether the second docking guide signal is a left-area signal or a right-area signal and determine a movement direction along the boundary according to the checked result. For example, the robot cleaner 20 moves to the right when the second docking guide signal which is the left-area signal is sensed while moving toward the docking station 10 such that the robot cleaner 20 reaches a predetermined position from the front side of the docking station 10 (360).

Next, when the robot cleaner 20 senses the docking signal while moving along the boundary, the robot cleaner is aligned with the docking station 10, is moved to a docking position of the docking station 10 according to the docking signal, and is docked (370 and 380).

If the first docking guide signal is not sensed in Operation 330 but a second docking guide signal is sensed, the robot cleaner 20 moves in a direction (e.g., an opposite direction) different from the transmission direction of the second docking guide signal (390 and 400).

Next, the robot cleaner 20 checks whether the boundary between the first docking guide area and the second docking guide area is sensed, while moving in the direction different from the transmission direction of the second docking guide signal. The robot cleaner 20 continuously senses the docking guide signal even when moving in the direction different from the transmission direction of the second docking guide signal and determines that the robot cleaner is located at the boundary when the sensed docking guide signal is changed from the second docking guide signal to the first docking guide signal (410).

Next, the robot cleaner 20 moves along the boundary when the boundary between the first docking guide area and the second docking guide area is sensed (360).

Next, when the robot cleaner 20 senses the docking signal while moving along the boundary, the robot cleaner is aligned with the docking station 10, is moved to the docking position of the docking station 10 according to the docking signal, and is docked (370 and 380).

If the first docking guide signal and the second docking guide signal are not sensed in Operations 330 and 390 and the docking signal is sensed, the robot cleaner is aligned with the docking station 10, is moved to the docking position of the docking station 10 according to the docking signal, and is docked (420 and 380).

The method of controlling a robot cleaner according to the above-described example embodiments may be recorded in computer-readable media including program instructions to implement various operations embodied by a computer. The media may also include, alone or in combination with the program instructions, data files, data structures, and the like.

Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The method of controlling a robot cleaner may be executed on a general purpose computer or processor or may be executed on a particular machine such as the robot cleaner described herein.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A system comprising:
   a docking station having a first transmission unit to transmit a first docking signal in a first direction, the first docking signal comprising at least a first signal pulse and a second signal pulse, wherein the first signal pulse has a pulse width that has a different time length than a pulse width of the second signal pulse; and
   a robot cleaner comprising:
   a reception unit to receive the first docking signal from the docking station; and
   a control unit configured to determine if the received first docking signal is an unreflected wave received directly from the first transmission unit or if the received first docking signal is a reflected wave produced by reflection of the first docking signal by an obstacle, the control unit to control movement of the robot cleaner based on whether the received first docking signal is determined to be the reflected wave or the unreflected wave.

2. The system according to claim 1, wherein the docking station further comprises a second transmission unit to transmit a second docking signal in a second direction, the second docking signal comprising at least a first signal pulse and a second signal pulse, wherein the first signal pulse has a pulse width that has a different time length than a pulse width of the second signal pulse.

3. The system according to claim 2, wherein the first docking signal sensed by the robot cleaner located in a first short-distance docking guide area is distinguished from the first docking signal sensed by the robot cleaner in a first long-distance docking guide area, and
   the second docking signal sensed by the robot cleaner located in a second short-distance docking guide area is distinguished from the second docking signal sensed by the robot cleaner in a second long-distance docking guide area.

4. The system according to claim 3, wherein the docking station further comprises a third transmission unit to transmit a third docking signal in a direction towards a front side of the docking station between the first docking signal and the second docking signal.

5. The system according to claim 4, wherein the first short-distance docking guide area and the second short-distance docking guide area do not overlap each other.

6. The system according to claim 1, wherein the first signal pulse and the second signal pulse are consecutive signal pulses.

7. The system according to claim 2, wherein the docking station further comprises a third transmission unit to transmit a third docking signal from a central portion of a front side of a main body thereof within a predetermined angle range such that a docking area which does not overlap the first docking guide area or the second docking guide area is formed,
   wherein pulse widths of a plurality of signal pulses included in the docking signal are adjusted to different lengths.

8. The system according to claim 7, wherein the adjusting of the pulse widths of the plurality of signal pulses to the different lengths comprises adjusting pulse widths of consecutive signal pulses to different lengths.

9. The system according to claim 7, wherein the third transmission unit to transmit the third docking signal includes a light emitting unit to generate the third docking signal and a guide portion to guide a traveling direction of the third docking signal such that the third docking signal is formed at the central portion of the front side of the main body within the predetermined angle range.

10. The system according to claim 1, wherein the first transmission unit to transmit the first docking guide signal includes a light emitting unit to generate the first docking guide signal and a shading plate to block some of the first docking guide signal so as to reduce a spreading angle of the first docking guide signal.

11. The system according to claim 10, wherein the docking station further comprises a lens unit provided outside the light emitting unit so as to spread the first docking guide signal.

12. The docking system comprising:
a docking station comprising:
a transmission unit to transmit a single docking signal comprising a repetitive waveform having a first signal pulse and a second signal pulse embedded within each repetition of the repetitive waveform and wherein the docking signal is transmitted to both a short-distance docking guide area and to a long-distance docking guide area; and
a controller to control the docking signal to adjust a duration of a peak intensity of the first signal pulse to be different than a duration of a peak intensity of the second signal pulse transmitted by the transmission unit,
and the docking station is configured to communicate with a robot cleaner comprising:
a reception unit configured to receive the docking signal from the docking station; and
a control unit configured to determine if the received docking signal is received in the short-distance docking guide area or in the long-distance guide area based on the received docking signal.

13. The system according to claim 1, wherein the first transmission unit is configured to transmit a repetitive waveform of the first docking signal, and wherein the first signal pulse and the second signal pulse are embedded within each repetitive waveform of the first docking signal.

14. The system according to claim 1, wherein, if it is determine that the received first docking signal is the unreflected wave, the control unit is configured to control the robot cleaner to move in a travel direction according to a transmission direction of the received first docking signal.

15. The system according to claim 1, wherein, if it is determined that the received first docking signal is the reflected wave, the control unit is configured to control the robot cleaner to move in a travel direction that is different from a transmission direction of the received first docking signal.

16. The system according to claim 13, wherein the control unit of the robot cleaner is configured to determine a time length between high points of the first and second signal pulses of the first docking signal received by the reception unit and to determine if the received first docking signal is the unreflected wave or the reflected wave based on the determined time length between the high points of the first and second signal pulses.

17. The docking system according to claim 12 wherein the transmission unit comprises a first transmission unit to transmit a first docking signal comprising the first signal pulse and the second signal pulse and a second transmission unit to transmit a second docking signal comprising a third signal pulse and a fourth signal pulse to both the short-distance docking guide area and to the long-distance docking guide area.

18. The docking system according to claim 17, wherein the first docking signal and the second docking guide signal are distinguished from each other by a bit array.

19. The docking system according to claim 17, wherein the first transmission unit transmits the first docking signal at a spread angle of at least ninety degrees from the second docking signal transmitted by the second transmission unit thereby forming a docking area in a central area of a front side of the docking station located between the first docking signal and the second docking signal.

20. The docking system according to claim 19, wherein the docking area is implemented as a non-signal area.

21. The docking system according to claim 19, wherein the first docking signal and the second docking signal are transmitted so as to not overlap with each other.

22. The docking system according to claim 19, wherein the docking station further comprises a third transmission unit to transmit a third docking signal to the docking area from the central portion of the front side of the main body of the docking station within a predetermined angle range, and wherein the first transmission unit and the second transmission unit are mounted on either side of the third transmission unit.

23. The docking system according to claim 19, wherein the docking station further comprises a third transmission unit to transmit a third docking signal to the docking area from the central portion of the front side of the main body of the docking station within a predetermined angle range, such that the docking area does not overlap the short-distance docking guide area or the long-distance docking guide area.

24. A docking system comprising:
a docking station comprising:
a first transmission unit, disposed on the docking station, to transmit a single first docking signal comprising a first signal pulse and a second signal pulse to both a short-distance docking guide area and to a long-distance docking guide area;
a second transmission unit, disposed on the docking station, to transmit a single second docking signal comprising a third signal pulse and a fourth signal pulse to both the short-distance docking guide area and to the long-distance docking guide area; and
a controller to control the first docking signal to adjust a duration of a peak intensity of the first signal pulse to be different than a duration of a peak intensity of the second signal pulse transmitted by the first transmission unit; and
a robot cleaner comprising:
a reception unit to receive the first docking signal from the first transmission unit or the second docking signal from the second transmission unit; and
a control unit configured to determine if the received first docking signal or second docking signal is an unreflected wave received directly from the first transmission unit or the second transmission unit or if the received first docking signal or second docking signal is a reflected wave produced by reflection of the first docking signal or the second docking signal by an obstacle.

25. The system according to claim 24, wherein the control unit controls a movement of the robot cleaner based on whether the received first docking signal or second docking signal is determined to be the reflected wave or the unreflected wave.

26. The docking system according to claim 12, wherein the control unit is further configured to determine if the received docking signal is an unreflected wave received directly from the transmission unit or if the received docking signal is a reflected wave produced by reflection of the docking signal by an obstacle.

27. The docking system according to claim 26, wherein the control unit controls a movement of the robot cleaner based on whether the control unit determines the received docking signal to be the reflected wave or the unreflected wave.

\* \* \* \* \*